(No Model.)
J. O'BRIEN.
FLANGING MACHINE.
No. 309,353. Patented Dec. 16, 1884.
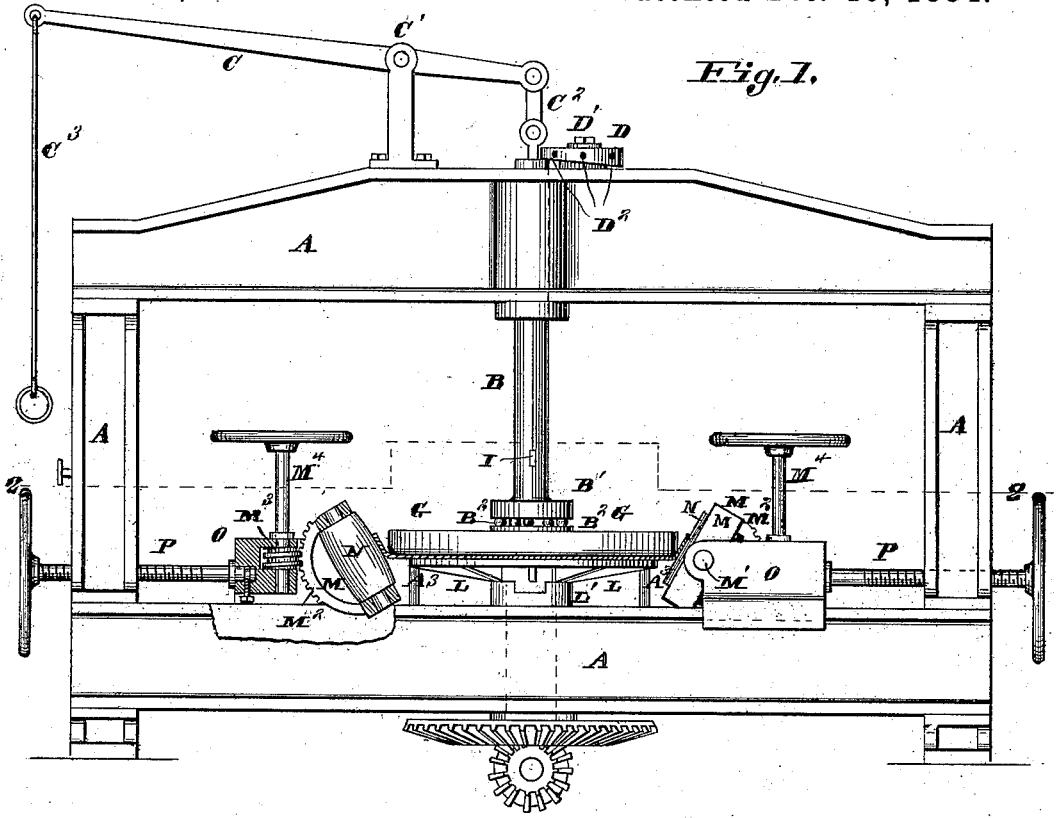
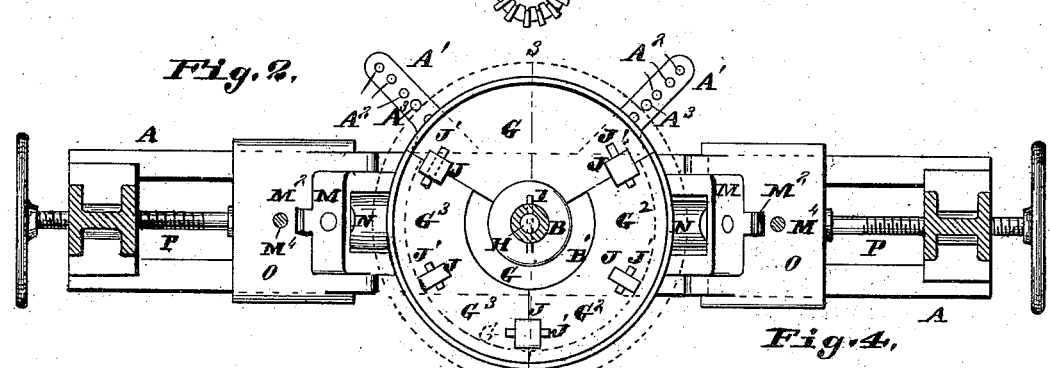
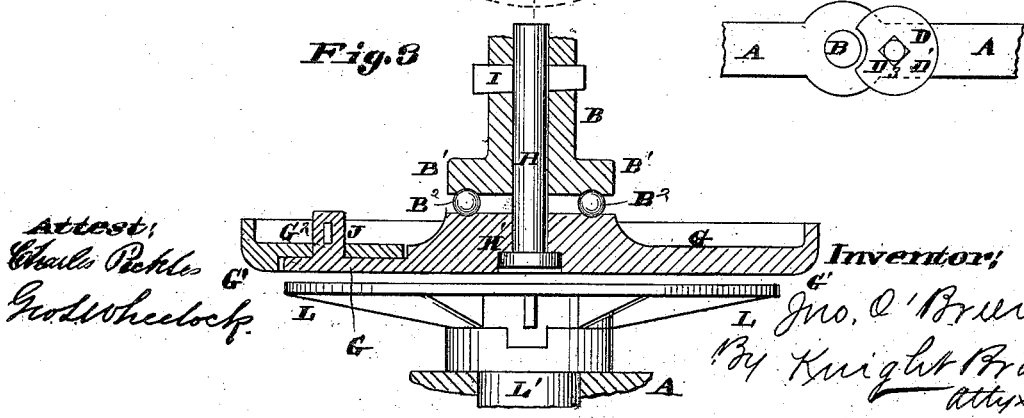
Attest:
Charles Pickles
Geo. L. Wheelock
Inventor:
Jno. O'Brien
By Knight Bros
Attys

UNITED STATES PATENT OFFICE.

JOHN O'BRIEN, OF ST. LOUIS, MISSOURI, ASSIGNOR TO JOHN O'BRIEN & CO., OF SAME PLACE.

FLANGING-MACHINE.

SPECIFICATION forming part of Letters Patent No. 309,353, dated December 16, 1884.

Application filed March 29, 1884. (No model.)

*To all whom it may concern:*

Be it known that I, JOHN O'BRIEN, of the city of St. Louis, in the State of Missouri, have invented a certain new and useful Improvement in Machines for Flanging Boiler-Heads, of which the following is a full, clear, and exact description, reference being had to the accompanying drawings, forming part of this specification, and in which—

Figure 1 is a side elevation, part broken away and part in vertical section. Fig. 2 is a horizontal section taken on line 2 2, Fig. 1. Fig. 3 is a detail vertical section taken on line 3 3, Fig. 2. Fig. 4 is a detail top view of the beam, showing the locking-disk.

This invention relates to a machine for flanging the heads of boilers; and it consists in features of novelty hereinafter fully described, and pointed out in the claims.

Referring to the drawings, A represents the frame of the machine, in the upper part of which is journaled a vertical shaft, B, adapted to have end movement and to be lifted by a lever, C, fulcrumed to the frame at C', and connected to the shaft by a link, C², or by other suitable means, and having connected to its outer end a pull rod or rope, C³. When the machine is at work, the shaft is held down by a button, D, secured to the top of the frame near the shaft by means of a post, D', around which it turns. It is turned by any suitable means. I have shown it provided with holes D² for the insertion of a rod or bar, by which it can be turned. The lower surface of this button is inclined, as shown in Fig. 1, so that by turning it more or less it is tightened upon the shaft, and it has a notch, D³, (see Fig. 4,) which when turned opposite the shaft will allow the shaft to be raised. Secured to the lower end of this shaft is the flanging-disk G, having rounded lower edge, G'. The disk is connected to the shaft by means of a short shaft, H, which passes up through the disk and into a socket in the lower end of the shaft B, and has a head, H', on its lower end, received by a countersink in the lower surface of the disk. The two shafts are connected by a transverse key, I. The disk is thus raised and lowered with the shaft, but is prevented from rising on the shaft. The lower end of the shaft B has an outturned flange, forming a head, B', between which and the disk are preferably placed friction-balls B², fitting in grooves in the head and disk. The disk is preferably made in sections for the more easy removal of the head after it is formed, as the metal in cooling shrinks tight around the disk. There is one main section, lettered G, and two small sections, lettered G² G³. The diameter of the main section is decreased where the small sections fit over it, and it has lugs J, which enter perforations in the small sections when the disk is put together, through which pass keys J', to hold the small sections in place when the machine is at work. When a head has been flanged, the keys J' are removed and the two sections taken out, and the head will then be relieved. Beneath the disk is a revolving table, L, supported on a shaft, L', journaled in the lower part of the frame and turned by suitable mechanical means. The piece of metal to be flanged is placed upon the table, the disk having been raised out of the way by the lever, as described, and the disk is then lowered until it rests upon the piece of metal, where it is clamped and held by the button.

For convenience in getting the piece of metal concentric with the table, arms A' are secured to or cast upon the frame, which have holes A² to receive pins A³, against which the piece is forced. These arms project radially from the center of the table, so that pieces of metal of different diameters can be adjusted upon the table by simply moving the pins in or out. When the table is turned, the disk and plate of metal are turned with it, and the edge of the latter is turned up by blocks M, provided with friction-rollers N, and held in sliding heads O, moved to and from the table by feed-screws P. The blocks have gudgeons M', by which they are held in the heads, and they are provided with cog-segments M², engaged by worm-wheels M³ on shafts M⁴, journaled in the heads. As the shafts are turned the inclination of the blocks and friction-rollers is changed, and the incline is made steeper as the flange is completed. One of the friction-rollers is made slightly convex on its outer surface, and is designed to be used most when the flanging is first commenced, while the other roller is straight, and is designed to be used most in finishing the flange.

I claim as my invention—

1. In a machine for flanging boiler-heads, the combination of a frame, a vertical shaft having a flanging-disk and adapted to be raised and lowered, a table on which the blank is supported, and the button by which the shaft is held down, as set forth.

2. In a machine for flanging boiler-heads, the button having an inclined under surface, in combination with a frame on which it is pivoted, a vertical shaft having a flanging-disk, and a table, the button adapted to hold the shaft with its disk down on the table, as set forth.

3. In a machine for flanging boiler-heads, a shaft having a flanging-disk made in sections to facilitate the removal of the boiler-head after it is formed thereon, as set forth.

4. In a machine for flanging boiler-heads, the flanging-disk composed of three sections, the main section being formed with lugs, and the other sections supported on the main section, and having openings through which the lugs are passed, the sections being secured together by keys passed through the lugs, as set forth.

5. In a machine for flanging boiler-heads, the combination of the table, shaft, and disk, the shaft and disk being connected together and having friction-balls placed between them, substantially as set forth.

6. In a machine for flanging boiler-heads, the combination of the table, shaft, and disk, the shaft and disk being connected by a short shaft and key, and having friction-balls placed between them, substantially as set forth.

7. In a machine for flanging boiler-heads, the combination of a frame having the radial arms A', formed with perforations $A^2$ to receive pins $A^3$, and a table revolving independently of the arms, as set forth.

8. In a machine for flanging boiler-heads, the flanging device consisting of the radially-sliding head O, having feed-screw P to adjust it to and from the flanging-disk, block M, journaled to the forward end of the head by gudgeons M', cog-segment $M^2$, formed on the rear of the block, roller N, journaled in the block, and vertical shaft $M^4$, having worm-screw $M^3$, and journaled in the rear part of the head, as set forth.

JOHN O'BRIEN.

In presence of—
 GEO. H. KNIGHT,
 SAML. KNIGHT.